(12) United States Patent
Ishida et al.

(10) Patent No.: US 10,472,818 B2
(45) Date of Patent: Nov. 12, 2019

(54) EXPANSION DEVICE OF PANELS

(71) Applicants: NARITA MFG., LTD., Nagoya-shi, Aichi (JP); TOKYO METROPOLITAN UNIVERSITY, Tokyo (JP); GrandTech Fujimoto Co., Ltd, Nagoya-shi, Aichi (JP)

(72) Inventors: Jozo Ishida, Nagoya (JP); Iri Takeshita, Nagoya (JP); Naoyuki Takesue, Hino (JP); Hideo Fujimoto, Nagoya (JP)

(73) Assignees: NARITA MFG., LTD., Nagoya-Shi, Aichi (JP); TOKYO METROPOLITAN UNIVERSITY, Tokyo (JP); GrandTech Fujimoto Co., Ltd, Nagoya-Shi, Aichi (JP)

( * ) Notice: Subject to any disclaimer, the term of this patent is extended or adjusted under 35 U.S.C. 154(b) by 0 days.

(21) Appl. No.: 15/909,182

(22) Filed: Mar. 1, 2018

(65) Prior Publication Data

US 2019/0264439 A1    Aug. 29, 2019

(30) Foreign Application Priority Data

Feb. 27, 2018  (JP) .................................. 2018-033190

(51) Int. Cl.
*E04B 1/68*    (2006.01)
*E04F 15/02*   (2006.01)
(Continued)

(52) U.S. Cl.
CPC .......... *E04B 1/6129* (2013.01); *E04B 1/3448* (2013.01); *E04B 1/68* (2013.01); *E04B 1/681* (2013.01); *E04B 1/6803* (2013.01)

(58) Field of Classification Search
CPC .......... E04B 1/68; E04B 1/681; E04B 1/6803; E04B 1/6129; E04B 1/3448; E04F 15/02; E04F 2290/045; E04D 13/151; E04D 3/38
(Continued)

(56) References Cited

U.S. PATENT DOCUMENTS 4,517,779 A * 5/1985 Dunsworth ........... E04B 1/6804
                                                         52/232
5,590,833 A    1/1997 Benenowski et al.
(Continued)

FOREIGN PATENT DOCUMENTS

CN    1478028 A    2/2004
EP    0722873 A1   7/1996
(Continued)

OTHER PUBLICATIONS

Extended European Search Report dated Oct. 5, 2018 in corresponding Application No. 18159994 (7 pages).
(Continued)

*Primary Examiner* — Phi D A
(74) *Attorney, Agent, or Firm* — Harness, Dickey & Pierce, P.L.C.

(57) ABSTRACT

A first constituent member configured such that a plurality of panels overlaps and a second constituent member configured such that a plurality of panels overlaps are included, in which a first link member that can be expanded and contracted is connected to the first constituent member, a second link member that can be expanded and contracted is connected to the second constituent member, each of the constituent members can be expanded and contracted by expansion and contraction of each of the link members, the first constituent member and the second constituent member can relatively be rotated around rotation axes and also can removably be connected, the first link member and the
(Continued)

second link member are connected to both ends of connecting link arm members via a free joint respectively, and the first link member and the second link member can be separated from each other.

3 Claims, 14 Drawing Sheets

(51) Int. Cl.
  *E04B 1/61* (2006.01)
  *E04B 1/344* (2006.01)
(58) Field of Classification Search
  USPC .......................................... 52/393, 395, 394
  See application file for complete search history.

(56) References Cited

U.S. PATENT DOCUMENTS

| | | |
|---|---|---|
| 9,321,469 B2 | 4/2016 | Hann |
| 2005/0066600 A1* | 3/2005 | Moulton .................. E01D 19/06 52/393 |
| 2012/0204509 A1* | 8/2012 | Lim ........................ E04H 9/021 52/393 |
| 2014/0157703 A1* | 6/2014 | Hunke .................... E04B 1/681 52/395 |
| 2015/0000550 A1 | 1/2015 | Hjort et al. |
| 2015/0101505 A1 | 4/2015 | Tsai |

FOREIGN PATENT DOCUMENTS

| | | |
|---|---|---|
| EP | 3287305 A1 | 2/2018 |
| WO | WO-9506580 A1 | 3/1995 |

OTHER PUBLICATIONS

Office Action dated Oct. 1, 2018 in corresponding TW Application No. 10720908530 (5 pages).

\* cited by examiner

EXPANSION DEVICE OF PANELS

BACKGROUND OF THE INVENTION

Field of the Invention

The present invention relates to an expansion device of panels.

Description of the Related Art

An expansion device 101 of panels shown in FIGS. 13 and 14 has been known as a device constituting an inner wall such as a sidewall, an upper wall, or a lower wall of a connecting passage formed inside a hood provided between bodies of rolling stock.

The expansion device 101 of panels includes side panels 102, 103 coupled to end surfaces 110a, 111a of bodies 110, 111 that are coupled to each other rotatably around axes 102a, 103a in an up and down direction respectively and a central panel 104 provided on an outer side of the side panels 102, 103 is arranged so as to be positioned in a substantially central portion between the end surfaces 110a, 111a and movable in a direction between the end surfaces 110a, 111a due to a link member 105.

Further, the link member 105 is connected to the outer side of the central panel 104 and also both sides thereof are rotatably connected to axes 110b, 111b in the up and down direction provided on the end surfaces 110a, 111a of the bodies 110, 111.

Then, the expansion device 101 of panels constitutes inner walls 114 such as a sidewall, an upper wall, and a lower wall of a connecting passage 113 provided in the bodies 110, 111.

SUMMARY OF THE INVENTION

In the expansion device 101 of panels in the above conventional technology, the length in the direction between the end surfaces 110a, 111a of the bodies 110, 111 cannot be made shorter than the length in a state in which inner-side tips of the side panels 102, 103 abut on each other and it is necessary to increase the number of panels to make the length shorter. However, the side panels 102, 103 are rotatably connected to the end surfaces 110a, 111a, the central panel 104 is connected to the link member 105, and the side panels 102, 103 and the central panel 104 are controlled by different mechanisms and so a problem that it is difficult to increase the number of panels with ease is posed.

An object of the present invention is to propose an expansion device of panels capable of making shorter the length in a direction of both ends thereof when the length is made the shortest by, compared with an expansion device of panels of the conventional technology, increasing the number of panels.

To solve the above problem, the present invention includes a first constituent member configured such that a plurality of panels overlaps and a second constituent member configured such that a plurality of panels overlaps, in which a first link member that can be expanded and contracted is connected to the first constituent member, a second link member that can be expanded and contracted is connected to the second constituent member, each of the constituent members can be expanded and contracted by expansion and contraction of each of the link members, the first constituent member and the second constituent member can relatively be rotated around rotation axes and also can removably be connected, the first link member and the second link member are connected to both ends of connecting link arm members via a free joint respectively, and the first link member and the second link member can be separated from each other.

The first link member may include a first main arm member and a second main arm member provided in parallel and may provide a plurality of connecting arm members provided in parallel by rotatably connecting one end of each of the connecting arm members to the second main arm member and the other end thereof to the first main arm member, the second link member may include a third main arm member and a fourth main arm member provided in parallel and may provide a plurality of connecting arm members provided in parallel by rotatably connecting one end of each of the connecting arm members to the fourth main arm member and the other end thereof to the third main arm member, a plurality of connecting link arm members may be provided, a main arm member in the first link member and a main arm member in the second link member may be connected by one of the connecting link arm members, a connecting arm member in the first link member and a connecting arm member in the second link member may be connected by the other of the connecting link arm members, panels provided at both ends of the constituent member may be rotatably connected to any main arm members, and a panel provided anywhere other than at both ends of the constituent member or one of the connecting arm members may be provided with a rotation axis, to which the other is loosely fitted and connected.

The expansion device of panels may be provided between bodies of rolling stock.

The present invention includes a first constituent member constructed such that a plurality of panels overlaps and a second constituent member constructed such that a plurality of panels overlaps, in which a first link member that can be expanded and contracted is connected to the first constituent member, a second link member that can be expanded and contracted is connected to the second constituent member, and each of the constituent members can be expanded and contracted by expansion and contraction of each of the link members so that the number of constituent panels can be made larger than that of the conventional technology and also the maximum length between both ends of the expansion device of panels can be made longer and the minimum length thereof can be made shorter.

Also, the first constituent member and the second constituent member can relatively rotate around rotation axes and are removably connected, the first link member and the second link member are connected to both ends of connecting link arm members via a free joint respectively, and the first link member and the second link member can be separated from each other so that even if, for example, an axis in an up and down direction of one body on which the expansion device of panels is mounted and an axis in the up and down direction of the other body are in a distorted positional relation, the expansion device of panels according to the present invention can respond satisfactorily by expanding or contracting.

Other objects, features and advantages of the invention will become apparent from the following description of the embodiments of the invention taken in conjunction with the accompanying drawings.

DESCRIPTION OF THE EMBODIMENTS

The expansion device of panels according to the present invention can suitably be used as constituting at least one of a sidewall, an upper wall, and a lower wall as inner walls of a connecting passage provided between bodies of a vehicle including a plurality of bodies such as rolling stock and a connected bus and in the following embodiments, the description is based on embodiments applied to the sidewall of a connecting passage of rolling stock. In the diagrams, profile lines are omitted to avoid complication of diagrams.

First Embodiment

Figure 1:
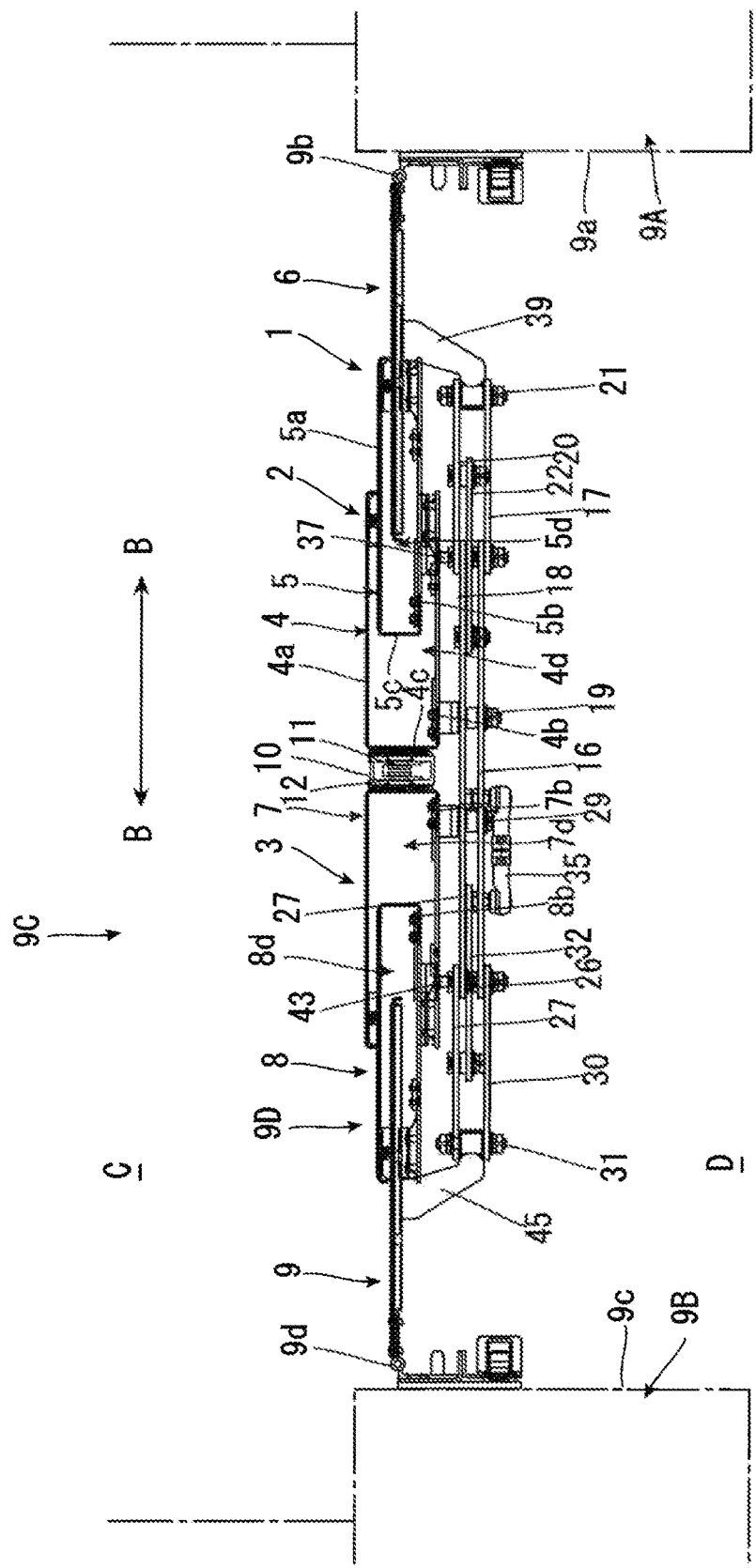
FIG. 1 is a top view when an expansion device of panels according to a first embodiment of the present invention is applied as a sidewall of a connecting passage provided between bodies of rolling stock.

FIG. 1 is a top view when an expansion device 1 of panels according to a first embodiment of the present invention is applied as a sidewall 9D of a connecting passage 9C by providing the expansion device 1 between bodies 9A, 9B of rolling stock. Hereinafter, an A-A direction in FIG. 2 is assumed to be an up and down direction, a B-B direction to be a direction between end surfaces (horizontal direction) of bodies, an upper side of FIG. 1 to be an inner side C, and a lower side to be an outer side D.

Figure 2:
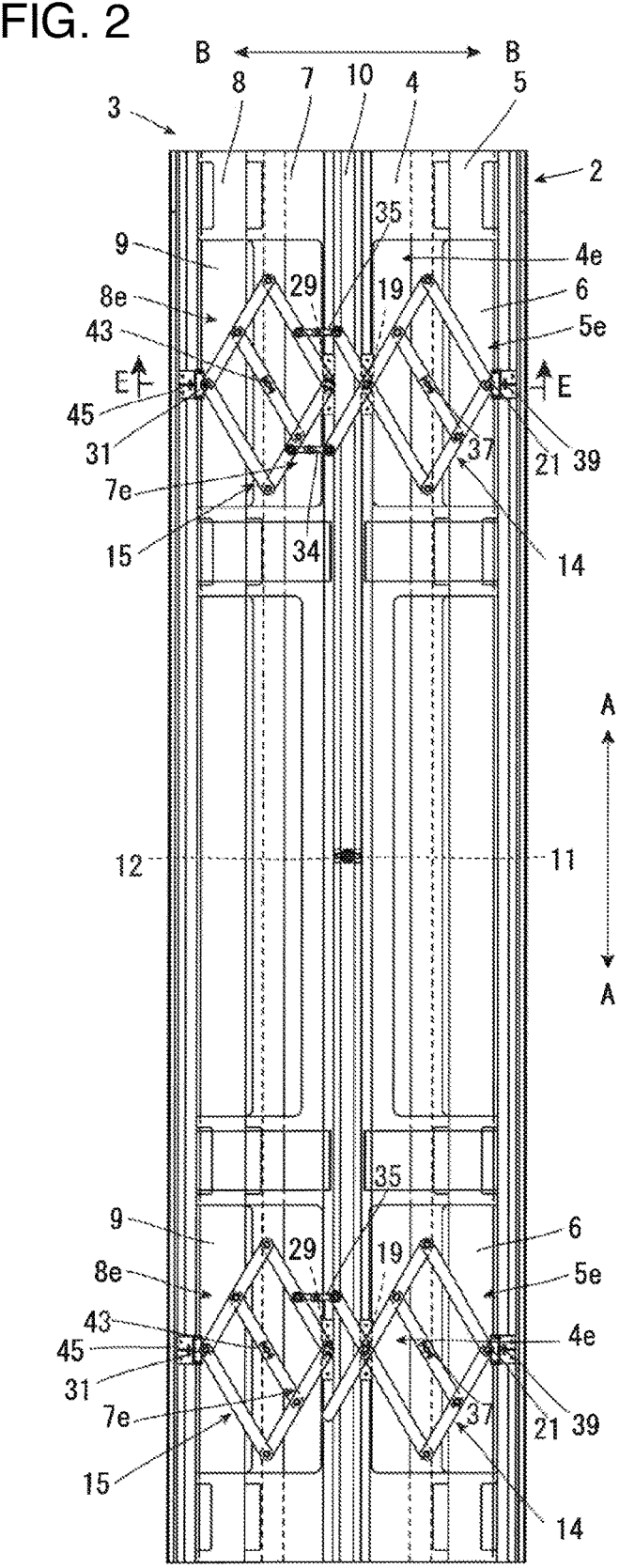
FIG. 2 is a diagram when the expansion device of panels in FIG. 1 is viewed from outside.

The expansion device 1 of panels includes, as shown in FIGS. 1 and 2, a first constituent member 2 and a second constituent member 3.

The first constituent member 2 includes, as shown in FIGS. 1 and 2, three panels of a first panel 4, a second panel 5, and a third panel 6 and these panels are disposed such that at least portions of neighboring panels overlap with each other in the B-B direction (horizontal direction) between end surfaces 9a, 9c of the bodies 9A, 9B. Also, the second constituent member 3 includes, as shown in FIGS. 1 and 2, three panels of a fourth panel 7, a fifth panel 8, and a sixth panel 9 and these panels are disposed such that at least portions of neighboring panels overlap with each other in the B-B direction (horizontal direction) between end surfaces 9a, 9c of the bodies 9A, 9B.

Figure 3:
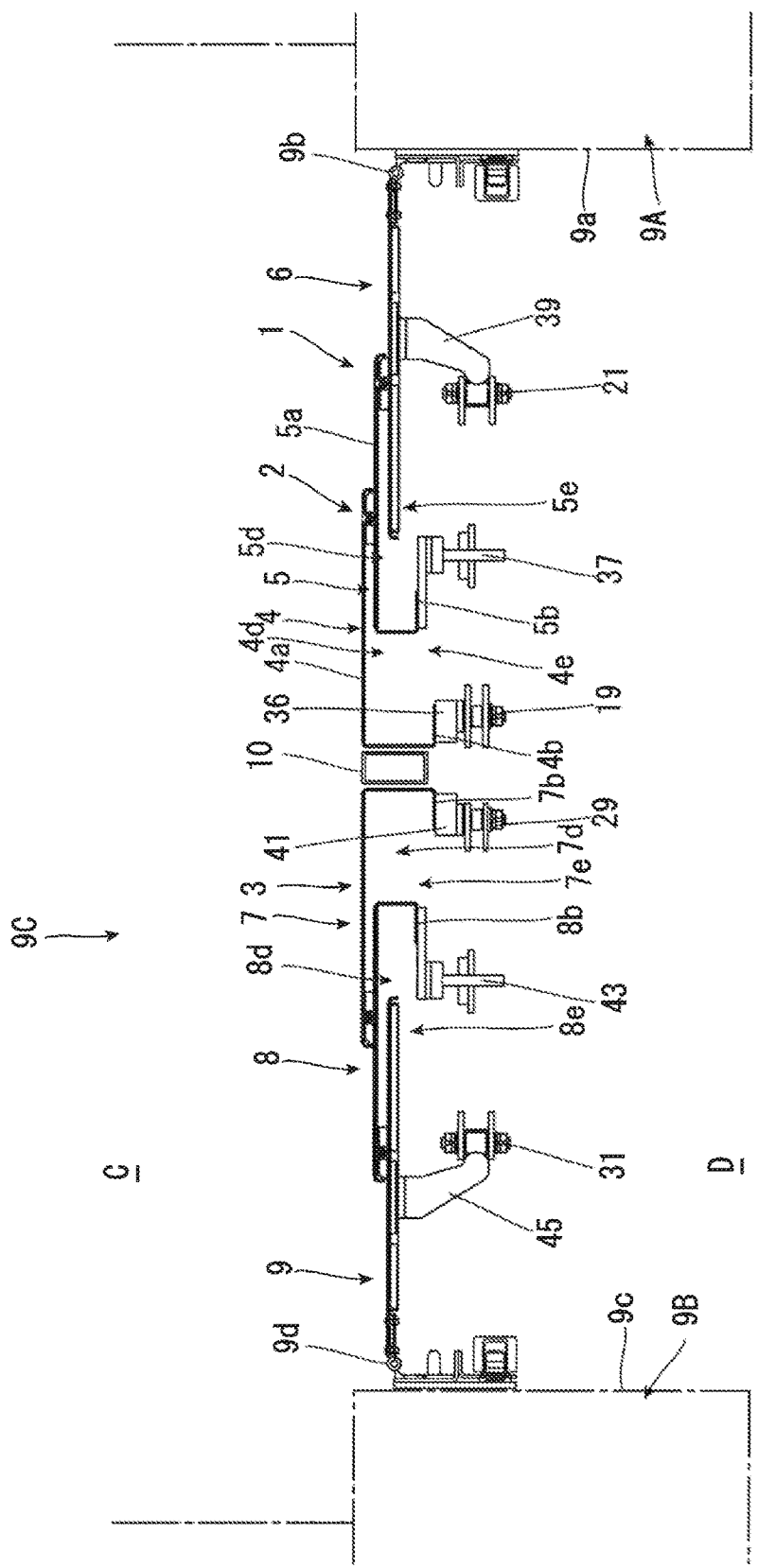
FIG. 3 is an E-E line end view in FIG. 2.

The first panel 4 is formed such that, as shown in FIGS. 1 to 3, an inner-side piece 4a and an outer-side piece 4b are formed substantially in parallel by a plate member being bent and also ends on the opposite side of the second panel 5 in the horizontal direction of the inner-side piece 4a and the outer-side piece 4b are connected by a connecting portion 4c so that the cross section thereof is formed in a U-shape and also the second panel 5 side in the horizontal B-B direction and the vertical A-A direction are open. Accordingly, a housing space 4d open on the second panel 5 side and in the vertical A-A direction is formed in the first panel 4. Also, as shown in FIGS. 1 to 3, a notch 4e that is open only in a front and rear direction and on the second panel 5 side is formed in a vertical portion of the outer-side piece 4b of the first panel 4.

The second panel 5 is formed such that an inner-side piece 5a and an outer-side piece 5b are formed substantially in parallel by a plate member being bent and also ends on the opposite side of the third panel 6 in the horizontal direction of the inner-side piece 5a and the outer-side piece 5b are connected by a connecting portion 5c so that the cross section thereof is formed in a U-shape and also the third panel 6 side in the horizontal B-B direction and the vertical A-A direction are open. Accordingly, a housing space 5d open on the third panel 6 side and in the vertical A-A direction is formed in the second panel 5. Also, as shown in FIGS. 1 to 3, a notch 5e that is open only in the front and rear direction and on the third panel 6 side is formed in a vertical portion of the outer-side piece 5b of the second panel 5.

The second panel 5 is housed, as shown in FIG. 1, inside the housing space 4d of the first panel 4 in such a way that the third panel 6 side protrudes and also disposed slidably with respect to the first panel 4 in an overlapping direction of panels such as the horizontal B-B direction or the vertical A-A direction.

Also, the third panel 6 is formed from a plate member, one end thereof in the horizontal B-B direction is connected to the end surface 9a of one body 9A rotatably around a rotation axis 9b in the up and down direction, the other end in the horizontal B-B direction of the third panel 6 is housed inside the housing space 5d of the second panel 5 such that the end surface 9a side protrudes. Also, the third panel 6 is relatively slidably with respect to the second panel 5 in the horizontal B-B direction and the vertical A-A direction.

The fourth panel 7 is formed, as shown in FIG. 1, in a structure obtained by horizontally inverting the first panel 4 in the horizontal B-B direction, the fifth panel 8 is formed in a structure obtained by horizontally inverting the second panel 5 in the horizontal B-B direction, and the sixth panel 9 is formed in a structure obtained by horizontally inverting the third panel 6 in the horizontal B-B direction.

The fifth panel 8 is housed, as shown in FIG. 1, inside a housing space 7d of the fourth panel 7 in such a way that the sixth panel 9 side protrudes and also disposed slidably with respect to the fourth panel 7 in the horizontal B-B direction and the vertical A-A direction.

Also, the other end of the sixth panel 9 is connected to the end surface 9c of the other body 9B rotatably around a rotation axis 9d in the up and down direction and one end in the horizontal B-B direction of the sixth panel 9 is housed inside a housing space 8d of the fifth panel 8 such that the end surface 9c side protrudes. Also, the sixth panel 9 is relatively slidably with respect to the fifth panel 8 in an overlapping direction of panels such as the horizontal B-B direction or the vertical A-A direction.

A columnar member 10 formed like a rectangular column is provided upright, as shown in FIGS. 1 to 3, between the first constituent member 2 and the second constituent member 3 substantially entirely in the vertical A-A direction. In a central portion in an upright direction of the columnar member 10, as shown in FIGS. 1 to 3, the first panel 4 of the first constituent member 2 is perpendicular to the upright direction of the columnar member 10 and also connected rotatably around a rotation axis 11 provided in the horizontal B-B direction.

Also in the central portion in the upright direction of the columnar member 10, as shown in FIGS. 1 to 3, the fourth panel 7 of the second constituent member 3 is perpendicular to the upright direction of the columnar member 10 and also connected rotatably around a rotation axis 12 provided in the horizontal B-B direction.

Accordingly, the first constituent member 2 and the second constituent member 3 are perpendicular to the upright direction of the columnar member 10 and also can relatively rotate around the rotation axes 11, 12 provided in the horizontal B-B direction.

As shown in FIG. 2, the first constituent member 2 has first link members 14, 14 that can be expanded and contracted connected to an upper portion and a lower portion thereof and the second constituent member 3 has second link members 15, 15 that can be expanded and contracted connected to an upper portion and a lower portion thereof.

Figure 4:
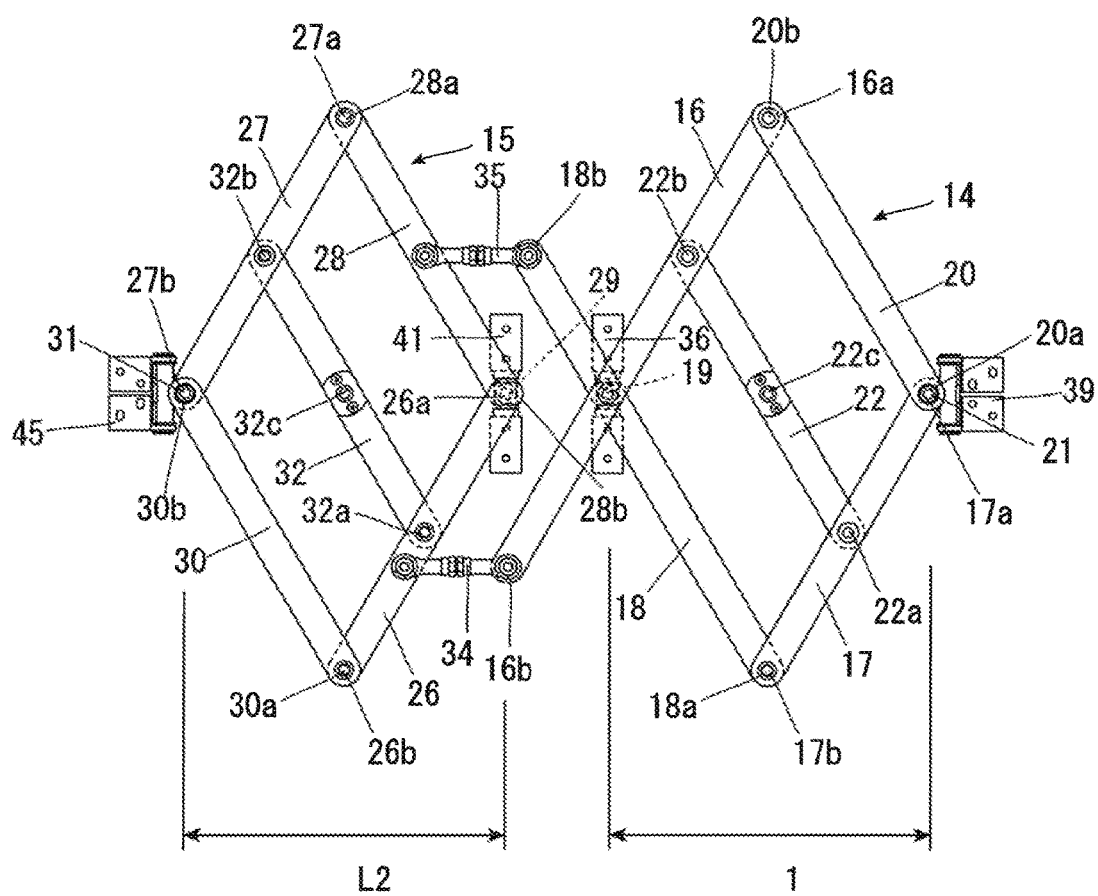
FIG. 4 is a side view of a link member used in the first embodiment of the present invention.

The first link member 14 has, as shown in FIG. 4, a first main arm member 16 and a second main arm member 17 formed like a long flat plate provided in parallel and the length in the axial direction of the first main arm member 16 is set longer than that in the axial direction of the second main arm member 17.

A first connecting arm member 18 formed like a long flat plate is connected to the first main arm member 16 rotatably around a rotation axis 19 and, as shown in FIG. 4, one end 16a of the first main arm member 16 and one end 18a of the first connecting arm member 18 protrude to one side from the rotation axis 19, the other end 16b of the first main arm member 16 and the other end 18b of the first connecting arm member 18 protrude to the other side from the rotation axis 19, and the first main arm member 16 and the first connecting arm member 18 are connected in an X shape. Also, the one end 18a of the first connecting arm member 18 is rotatably connected to the other end 17b of the second main arm member 17.

One end 20a of a second connecting arm member 20 formed like a long flat plate is connected to one end 17a of the second main arm member 17 rotatably around a rotation axis 21 and the other end 20b thereof is rotatably connected to the one end 16a of the first main arm member 16. Also, the second connecting arm member 20 is provided so as to be parallel to the first connecting arm member 18.

One end 22a of a third connecting arm member 22 formed like a long flat plate is rotatably connected to the central portion in the axial direction of the second main arm member 17 and the other end 22b thereof is rotatably connected to the central portion between the one end 16a of the first main arm member 16 and the rotation axis 19. The third connecting arm member 22 is provided so as to be parallel to the first connecting arm member 18 and the second connecting arm member 20.

That is, three connecting arm members 18, 20, 22 are provided in parallel between the first main arm member 16 and the second main arm member 17. Incidentally, the second connecting arm member 20 may not be provided.

Figure 5:
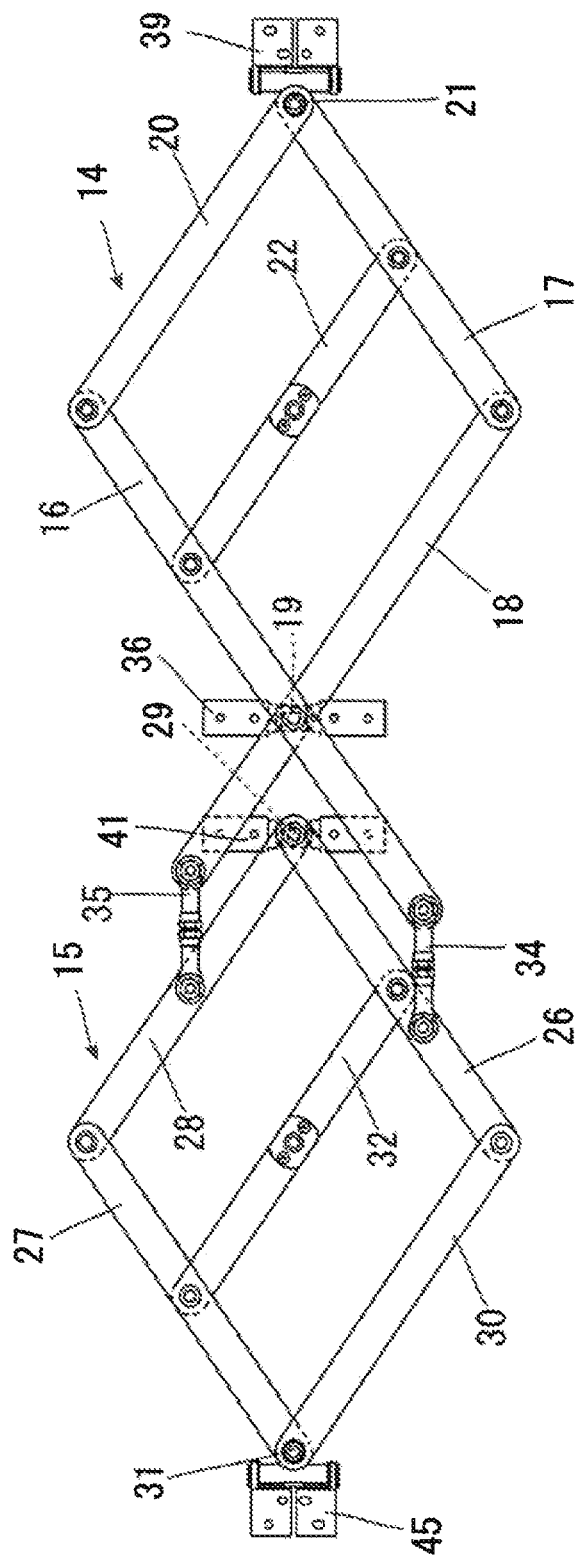
FIG. 5 is a diagram obtained by expanding in a left and right direction from the state of FIG. 4.
Figure 6:
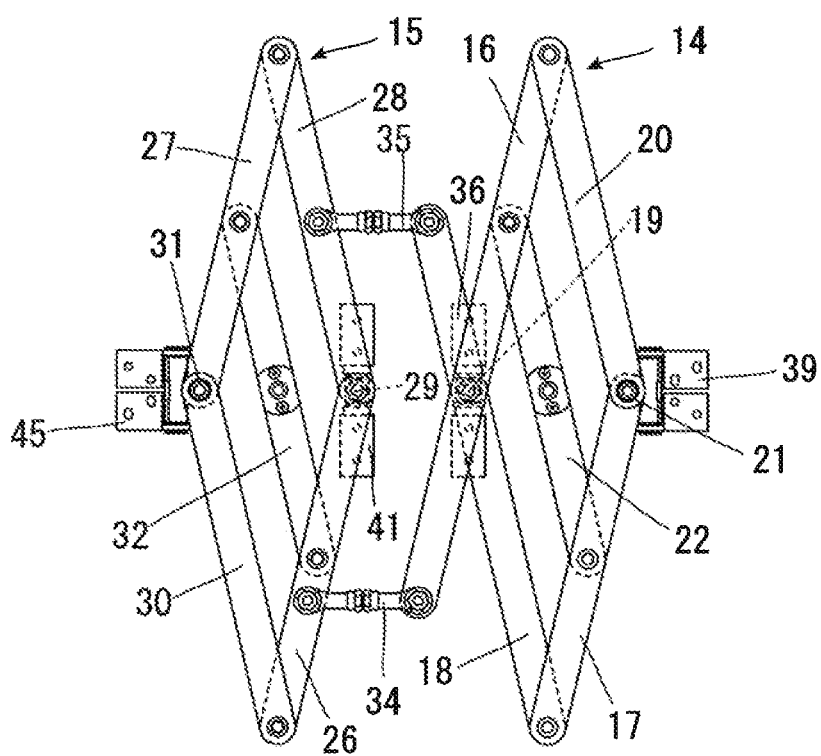
FIG. 6 is a diagram obtained by contracting in the left and right direction from the state of FIG. 4.

With the above configuration, the first link members 14 constitute a parallel link and can expand a distance L1 between the rotation axis 19 of the first main arm member 16 and the rotation axis 21 of the second main arm member 17, as shown in FIG. 5, from the state shown in FIG. 4 or contract the distance L1, as shown in FIG. 6 so that the first link member 14 can expand and contract.

The second link member 15 has a third main arm member 26 and a fourth main arm member 27 formed like a long flat plate provided in parallel and the length in the axial direction of the third main arm member 26 is set substantially the same as that in the axial direction of the fourth main arm member 27.

One end 28a of a fourth connecting arm member 28 formed like a long flat plate is rotatably connected to one end 27a of a fourth main arm member 27 and the other end 28b thereof is connected to one end 26a of a third main arm member 26 rotatably around a rotation axis 29.

One end 30a of a fifth connecting arm member 30 formed like a long flat plate is rotatably connected to the other end 26b of the third main arm member 26 and the other end 30b thereof is connected to the other end 27b of the fourth main arm member 27 rotatably around a rotation axis 31. Also, the fifth connecting arm member 30 is provided so as to be parallel to the fourth connecting arm member 28.

One end 32a of a sixth connecting arm member 32 formed like a long flat plate is rotatably connected to the central portion in the axial direction of the third main arm member 26 and the other end 32b thereof is rotatably connected to the central portion in the axial direction of the fourth main arm member 27. The sixth connecting arm member 32 is provided so as to be parallel to the fourth connecting arm member 28 and the fifth connecting arm member 30.

That is, three connecting arm members 28, 30, 32 are provided in parallel between the third main arm member 26 and the fourth main arm member 27. Incidentally, the fifth connecting arm member 30 may not be provided.

With the above configuration, the second link members 15 constitute a parallel link and can expand a distance L2 between the rotation axis 29 of the third main arm member 26 and the rotation axis 31 of the fourth main arm member 27, as shown in FIG. 5, from the state shown in FIG. 4 or contract the distance L2, as shown in FIG. 6 so that the second link member 15 can expand and contract.

One end of a first connecting link arm member 34 is connected to the other end 16b of the first main arm member 16 by a free joint capable of rotating in any direction. Also, the central portion in the axial direction of the third main arm member 26 is connected to the other end of the first connecting link arm member 34 by a free joint capable of rotating in any direction.

One end of a second connecting link arm member 35 is connected to the other end 18b of the first connecting arm member 18 by a free joint capable of rotating in any direction. Also, the central portion in the axial direction of the fourth connecting arm member 28 is connected to the other end of the second connecting link arm member 35 by a free joint capable of rotating in any direction.

The first connecting link arm member 34 and the second connecting link arm member 35 can each removably be disconnected and connected in the central portion in the axial direction thereof. Also, the expansion device 1 of panels as a whole only requires that three connecting link arm members be provided and one of the first connecting link arm member 34 and the second connecting link arm member 35 of the link members 14, 15 provided in the upper portion and the first connecting link arm member 34 and the second connecting link arm member 35 of the link members 14, 15 provided in the lower portion is not provided. In the present embodiment, as shown in FIG. 2, the first connecting link arm member 34 is not provided in the link members 14, 15 provided in the lower portion.

The rotation axis 19 of the first main arm member 16 in the first link member 14 is connected to the first panel 4 via a connecting fitting 36.

Accordingly, the first link member 14 can rotate clockwise and counterclockwise in FIG. 2 around the rotation axis 19 perpendicular to the upright direction of the first panel 4 and the direction of movement of the members 16, 17, 18, 20, 22 constituting the first link member 14 can be in a parallel positional relation with respect to the outer-side piece 4b of the first panel 4.

A rotation axis 37 projected so as to be perpendicular to the outer-side piece 5b is disposed in the second panel 5 of the first constituent member 2 so as to be positioned in the notch 4e of the first panel 4 so that, when the first panel 4 slides relative to the second panel 5 in an overlapping direction of panels such as the horizontal B-B direction or the vertical A-A direction, the rotation axis 37 and the first panel 4 will not interfere with each other.

A connecting hole 22c provided in the central portion in the axial direction of the third connecting arm member 22 is loosely fitted and rotatably connected to the rotation axis 37. Incidentally, the rotation axis 37 may be provided in the third connecting arm member 22 to provide the connecting hole 22c in the second panel 5.

The rotation axis 21 of the second main arm member 17 in the first link member 14 is securely installed on the outer side of an outer-side piece 6b of the third panel 6 in the first constituent member 2 via a connecting fitting 39.

With the above configuration, the panels 4, 5, 6 constituting the first constituent member 2 relatively slide in an overlapping direction of panels (any direction on the paper of FIG. 2) such as the horizontal B-B direction or the vertical A-A direction accompanying expansion and contraction of the first link member 14 and rotation around the rotation axis 19 of the first link member 14 so that the first constituent member 2 can expand and contract in any direction of overlapping directions of panels.

The rotation axis 29 of the third main arm member 26 in the second link member 15 is connected to the fourth panel 7 of the second constituent member 3 via a connecting fitting 41.

Accordingly, the second link member 15 can rotate clockwise and counterclockwise in FIG. 2 around the rotation axis 29 perpendicular to the upright direction of the fourth panel 7 and the direction of movement of the members 26, 27, 28, 30, 32 constituting the second link member 15 can be in a parallel positional relation with respect to the outer-side piece 7b of the fourth panel 7.

A rotation axis 43 projected so as to be perpendicular to the outer-side piece 8a is disposed in the fifth panel 8 of the second constituent member 3 so as to be positioned in the notch 7e of the fourth panel 7 so that, when the fifth panel 8 slides relative to the fourth panel 7 in an overlapping direction of panels such as the horizontal B-B direction or the vertical A-A direction, the rotation axis 43 and the fourth panel 7 will not interfere with each other.

A connecting hole 32c provided in the central portion in the axial direction of the sixth connecting arm member 32 is loosely fitted and rotatably connected to the rotation axis 43. Incidentally, the rotation axis 43 may be provided in the sixth connecting arm member 32 to provide the connecting hole 32c in the fifth panel 8.

The rotation axis 31 of the fifth main arm member 27 in the second link member 15 is securely installed on the outer side of an outer-side piece 9b of the sixth panel 9 via a connecting fitting 45.

With the above configuration, the panels 7, 8, 9 constituting the second constituent member 3 relatively slide in an overlapping direction of panels (any direction on the paper of FIG. 2) such as the horizontal B-B direction or the vertical A-A direction accompanying expansion and contraction of the second link member 15 and rotation around the rotation axis 29 of the second link member 15 so that the second constituent member 3 can expand and contract in any direction of overlapping directions of panels.

The first constituent member 2 and the second constituent member 3 can relatively rotate in a front and rear direction of FIG. 1 around the rotation axes 11, 12, both ends of the first connecting link arm members 34 are connected to each of the first main arm member 16 and the third main arm member 26 via a free joint, and both ends of the second connecting link arm members 35 are connected to each of the first connecting arm member 18 and the fourth connecting arm member 28 via a free joint so that even if the positional relation of an axis in the up and down direction of the one body 9A and an axis in the up and down direction of the other body 9B, the expansion device 1 of panels being mounted between the one body 9A and the other body 9B, is parallel, inclined, distorted, close, or separated, the expansion device 1 of panels can follow and respond to the positional relation.

If the axis in the up and down direction of the one body 9A and the axis in the up and down direction of the other body 9B change from, for example, a parallel state to a separated state or a close state, the expansion device 1 of panels can respond by the link members 14, 15 being expanded or contracted in the horizontal B-B direction to allow the first constituent member 2 and the second constituent member 3 to expand or contract in the horizontal B-B direction.

If the axis in the up and down direction of the one body 9A and the axis in the up and down direction of the other body 9B change from a parallel state to a vertically shifted state, the expansion device 1 of panels can respond by the link members 14, 15 being rotated around the rotation axes 19, 29 to allow panels constituting the first constituent member 2 and the second constituent member 3 to be mutually displaced in the vertical A-A direction.

If the axis in the up and down direction of the one body 9A and the axis in the up and down direction of the other body 9B change from a parallel state to a state in which only an upper portion or a lower portion is close, the expansion device 1 of panels can respond by only the link members 14, 15 provided in the upper portion or the lower portion being contracted to allow only the upper portion or the lower portion of the first constituent member 2 and the second constituent member 3 to contract in the horizontal B-B direction.

Figure 7:
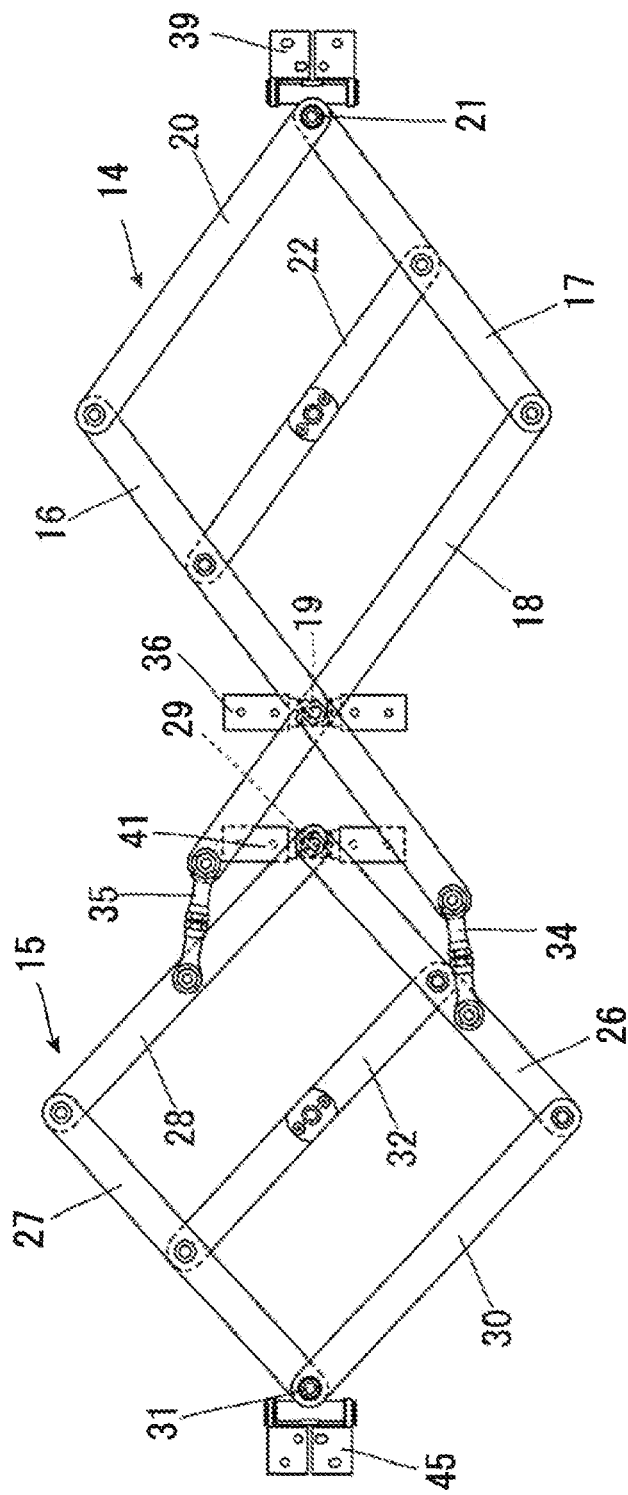
FIG. 7 is a diagram of a state in which an axis in an up and down direction of one body on which the expansion device of panels is mounted and an axis in the up and down direction of the other body are in a distorted positional relation from the state of FIG. 4.

If the axis in the up and down direction of the one body 9A and the axis in the up and down direction of the other body 9B change from a parallel state to a distorted state, the expansion device 1 of panels can respond by, for example, the first constituent member 2 and the second constituent member 3 being mutually rotated around the rotation axes 11, 12 and also, as shown in FIG. 7, the shape of the first link member 14 and that of the second link member 15 being deformed differently and the direction of movement of members constituting the first link member 14 and that of members constituting the second link member 15 being inclined or distorted to allow the movement (deformation) of the first link member 14 and that of the second link member 15 to be linked by the connecting link arm members 34, 35.

Thus, the expansion device 1 of panels can respond regardless of the mutual relative positional relation of the bodies 9A, 9B to which the expansion device 1 of panels is connected.

Also, by constituting the expansion device 1 of panels using six panels 4 to 9, compared with the conventional technology in which three panels 102, 103, 104 are used, the maximum length of the distance between the bodies 9A, 9B can be made longer and the minimum length thereof can be made shorter.

Also, the first constituent member 2 and the second constituent member 3 can easily be separated from each other by separating the central portions in the axial direction of the first connecting link arm member 34 and the second connecting link arm member 35 and disconnecting the columnar member 10 from the first constituent member 2 or the second constituent member 3. Also, the first constituent member 2 and the second constituent member 3 can easily be connected by the reverse operation.

In the above embodiment, the first connecting link arm member 34 connects the other end 16b of the first main arm member 16 and the central portion in the axial direction of the third main arm member 26 and the second connecting link arm member 35 connects the other end 18b of the first connecting arm member 18 and the central portion in the axial direction of the fourth connecting arm member 28, but the connecting position of the first connecting link arm member 34 can be set arbitrarily as long as the first main arm member 16 and the third main arm member 26 are connected and the connecting position of the second connecting link arm member 35 can be set arbitrarily as long as the first connecting arm member 18 and the fourth connecting arm member 28 are connected. Further, if the first link members 14 and the second link members 15 can each form a parallel link, shapes of the first main arm member 16, the third main arm member 26, the first connecting arm member 18, and the fourth connecting arm member 28 are not limited to those described above and can be formed arbitrarily.

Also, in the above embodiment, the first connecting link arm member 34 and the second connecting link arm member 35 can each separate the first link member 14 and the second link member 15 by removably separating the central portions in the axial direction thereof and in addition, the separation position of the first link member 14 and the second link member 15 can arbitrarily be set.

Second Embodiment

In the first embodiment, the first constituent member 2 and the second constituent member 3 are each constituted using three panels, but the number of constituent panels can be set to any number if the number of panels constituting the first constituent member 2 and that constituting the second constituent member 3 are the same and the number of constituent panels is equal to 2 or greater.

Figure 8:
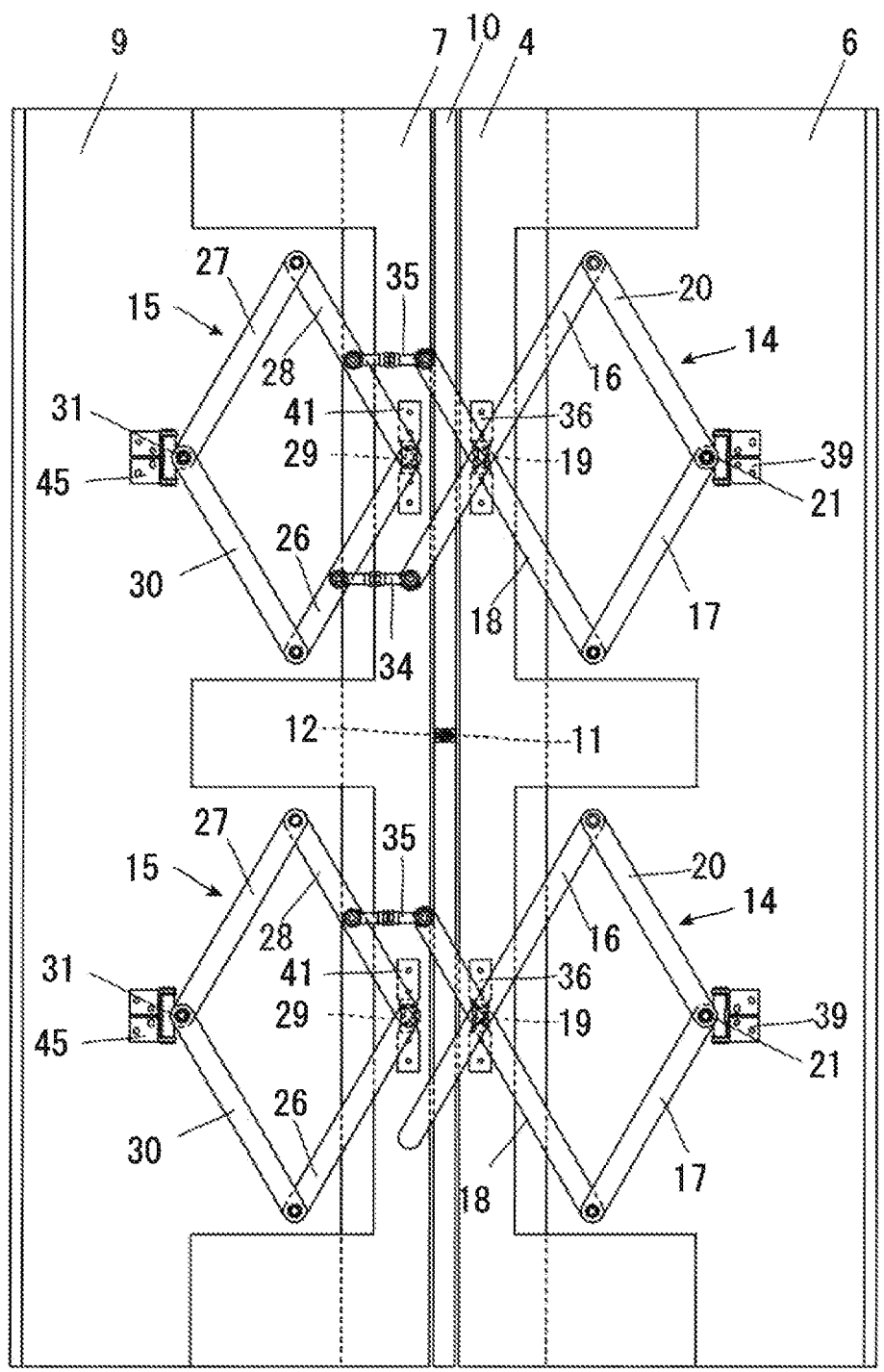
FIG. 8 is a schematic diagram when an example of the expansion device of panels according to a second embodiment of the present invention is viewed from outside.
Figure 9:
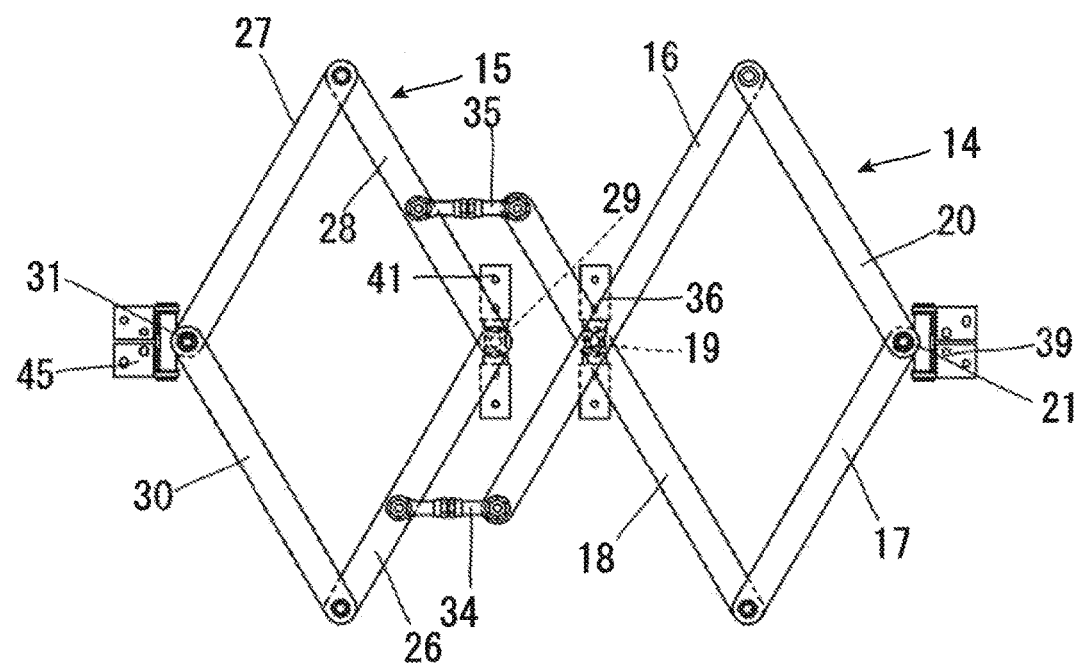
FIG. 9 is a side view of the link member used in FIG. 8.

For example, by removing, as shown in FIGS. 8 and 9, the first connecting arm member 18, the third connecting arm member 22, the second panel 5, and the fifth panel 8 from the configuration of the first embodiment, each of the first constituent member 2 and the second constituent member 3 can be constructed of two panels.

Figure 10:
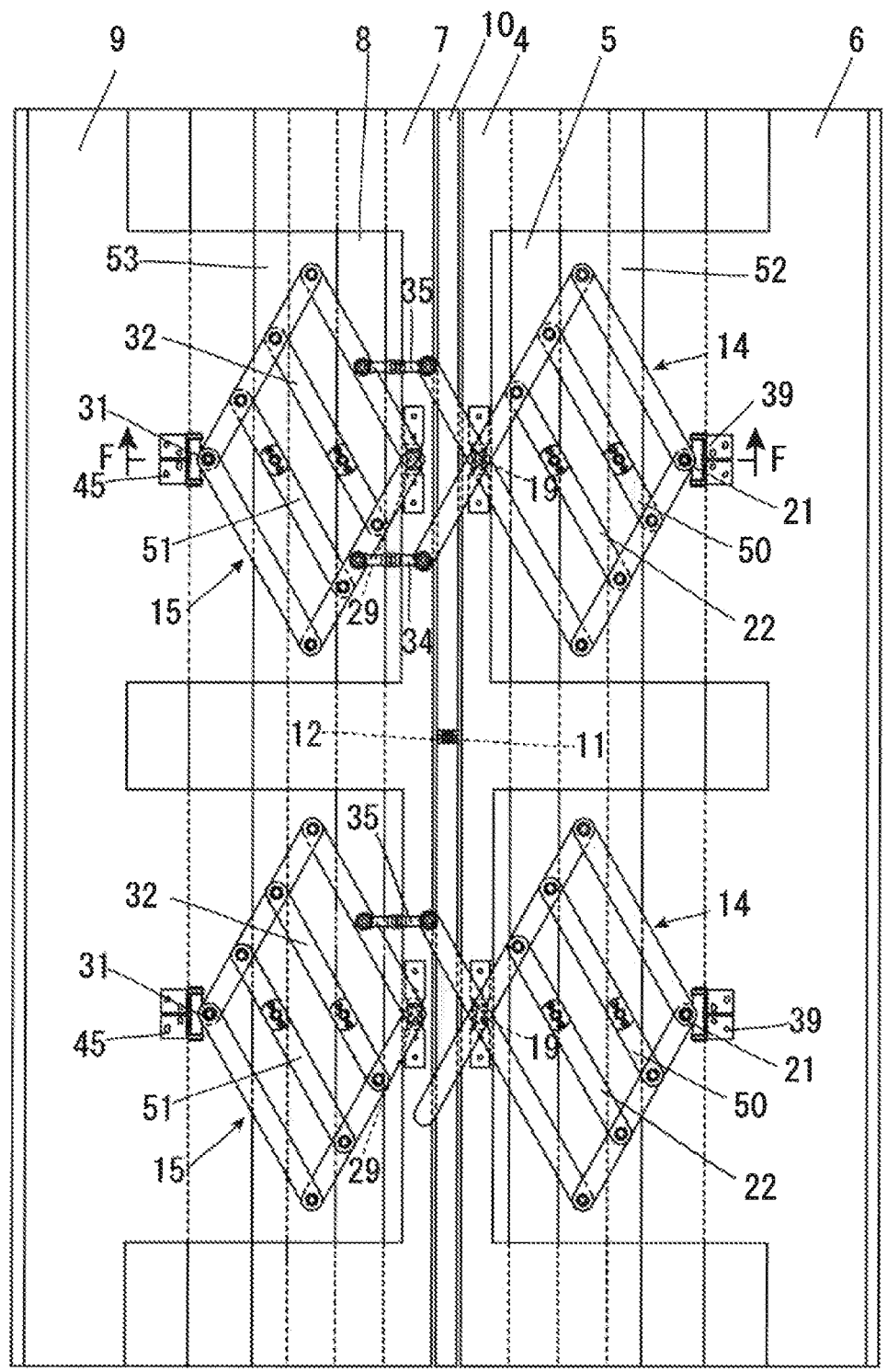
FIG. 10 is a schematic diagram when another example of the expansion device of panels according to the second embodiment of the present invention is viewed from outside.
Figure 11:
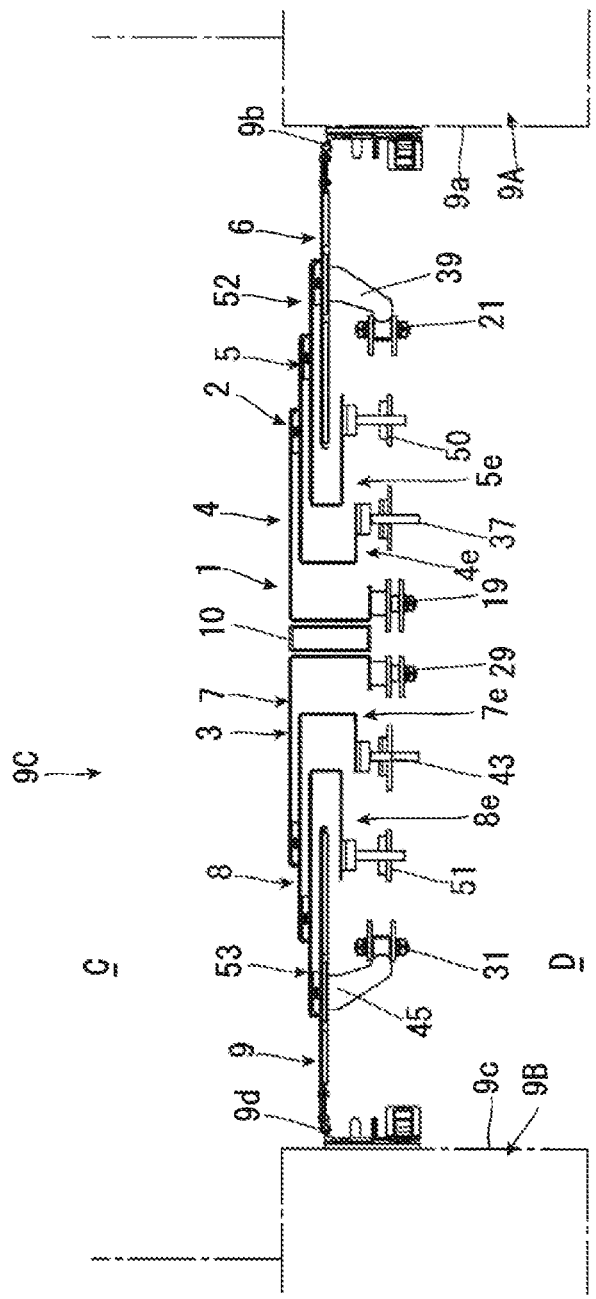
FIG. 11 is an end face schematic diagram of an F-F line in FIG. 10.
Figure 12:
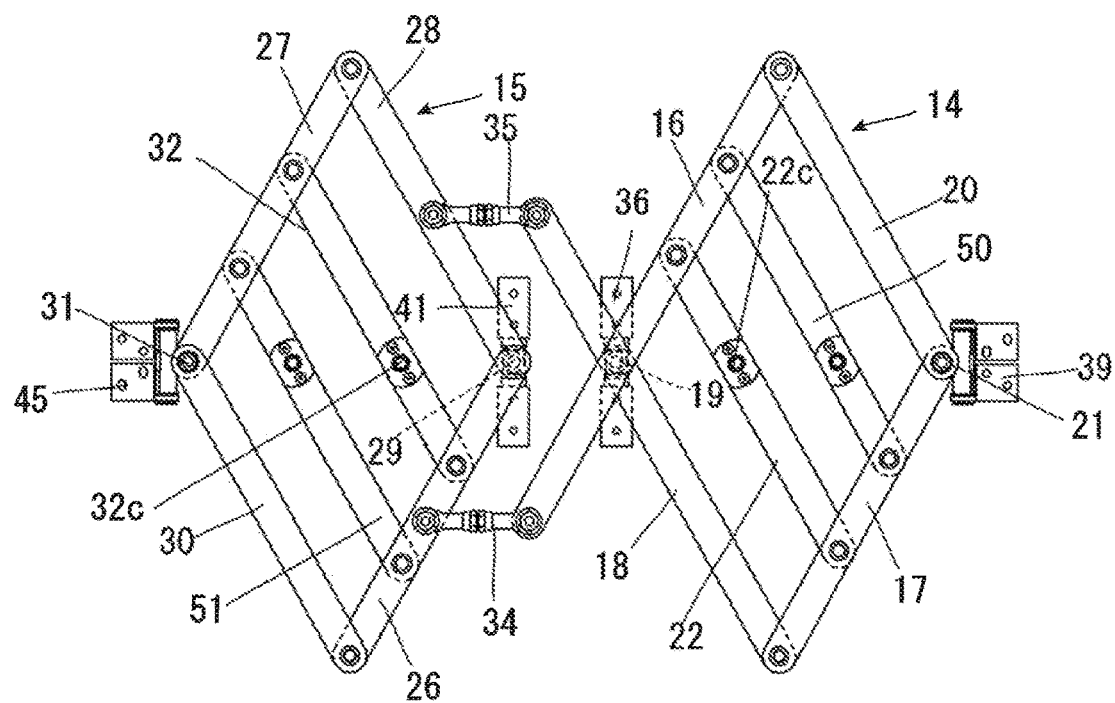
FIG. 12 is a side view of the link member used in FIG. 10.
Figure 13:
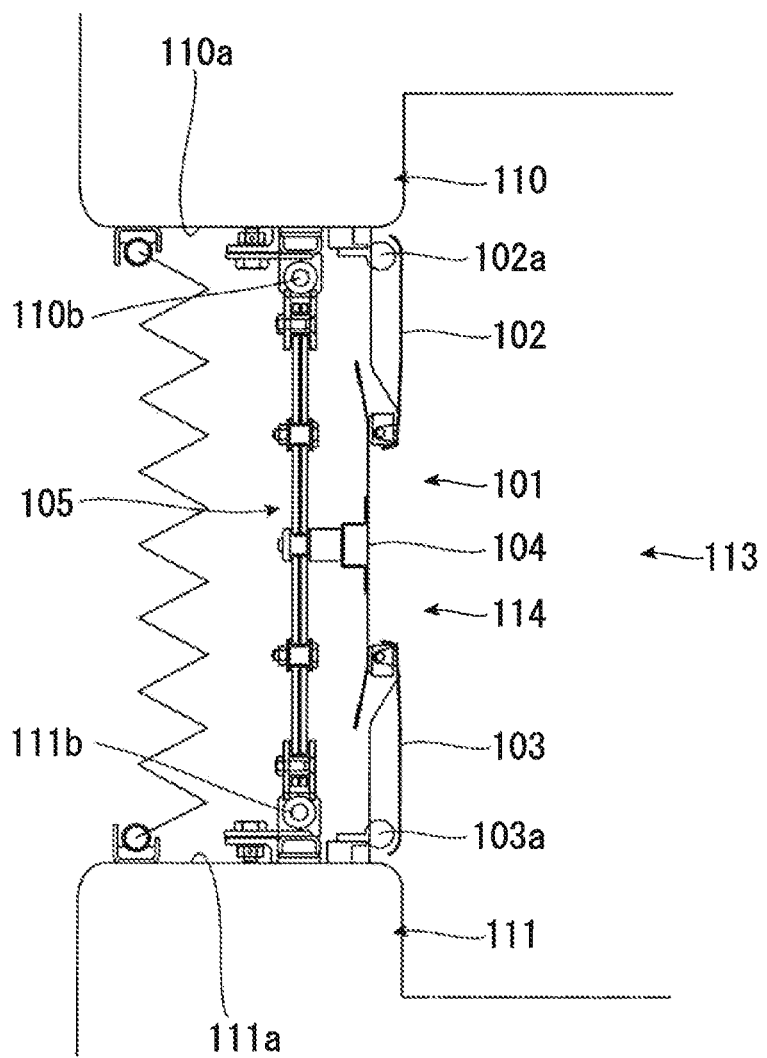
FIG. 13 is a cross-sectional view when an expansion device of panels in a conventional technology mounted between bodies is viewed from above.
Figure 14:
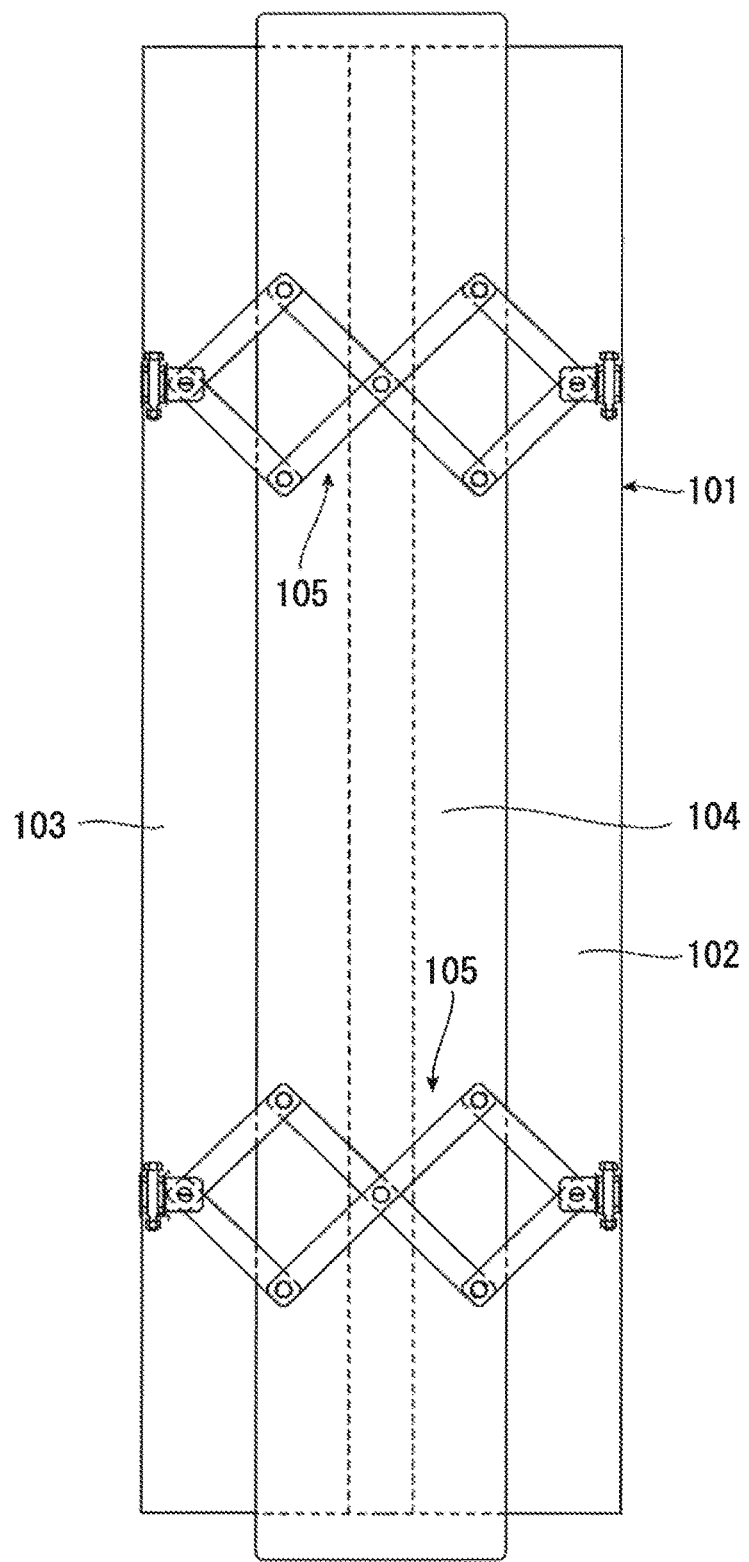
FIG. 14 is a view when the expansion device of panels in FIG. 13 is viewed from outside.

Also, as shown in FIGS. 10 to 12, the first constituent member 2 and that constituting the second constituent member 3 can each be constituted using four panels by increasing the number of connecting arm members provided in parallel with the first connecting arm member 18 between the first main arm member 16 and the second main arm member 17 by one for each of the first constituent member 2 side and the second constituent member 3 side, connecting arm members 50, 51 respectively, and connecting panels 52, 53 having a structure similar to that of the second panel 5 and the fifth panel 8 in the first embodiment to the connecting arm members 50, 51 that have been added.

The other structure is the same as that of the first embodiment and the description thereof is omitted.

Also in the second embodiment, the same effect as that of the first embodiment is achieved.

Third Embodiment

In the first and second embodiments, the columnar member 10 is provided between the first constituent member 2 and the second constituent member 3, but without providing the columnar member 10, the first constituent member 2 and the second constituent member 3 may be mutually rotatably connected by a rotation axis similar to the rotation axes 11, 12 in the central portion in the up and down direction.

The other structure is the same as that of the first and second embodiments and the description thereof is omitted.

Also in the third embodiment, the same effect as that of the first and second embodiments is achieved.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An expansion device of panels comprising:
a first constituent member constructed by a plurality of panels; and
a second constituent member constructed by a plurality of panels that are different from the plurality of panels constructing the first constituent member, wherein
adjacent panels of the first constituent member partly overlap each other, a first link member that can be expanded and contracted is connected to the first constituent member, and the first constituent member can be expanded and contracted by expansion and contraction of the first link member,
adjacent panels of the second constituent member partly overlap each other, a second link member that can be expanded and contracted is connected to the second constituent member, and the second constituent member can be expanded and contracted by expansion and contraction of the second link member,
the first constituent member and the second constituent member can relatively be rotated around rotation axes provided in the expansion and contraction direction of the link members and also can removably be connected, the first link member and the second link member are connected to both ends of connecting link arm members via a free joint respectively, and the first link member and the second link member can be separated from each other.

2. The expansion device of panels according to claim 1, wherein the first link member includes a first main arm member and a second main arm member provided in parallel and provides a plurality of connecting arm members provided in parallel by rotatably connecting one end of each of the connecting arm members to the second main arm member and the other end thereof to the first main arm member, the second link member includes a third main arm member and a fourth main arm member provided in parallel and provides a plurality of connecting arm members provided in parallel by rotatably connecting one end of each of the connecting arm members to the fourth main arm member and the other end thereof to the third main arm member, a plurality of the connecting link arm members is provided, a main arm member in the first link member and a main arm member in the second link member are connected by one of the connecting link arm members, a connecting arm member in the first link member and a connecting arm member in the second link member are connected by the other of the connecting link arm members, panels provided at both ends of the constituent members are rotatably connected to any main arm members, and a panel provided anywhere other than at both ends of the constituent members or one of the connecting arm members is provided with a rotation axis, to which the other is loosely fitted and connected.

3. The expansion device of panels according to claim 1, wherein the expansion device of panels is provided between bodies of rolling stock.

* * * * *